July 19, 1927.  1,636,138
W. KÖPPEN ET AL.
BALL OR TUBE MILL
Filed Dec. 8, 1926  2 Sheets-Sheet 1
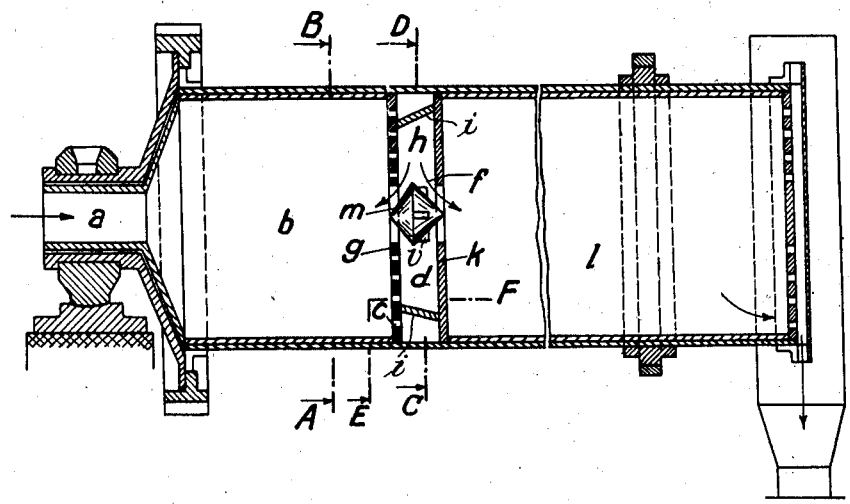
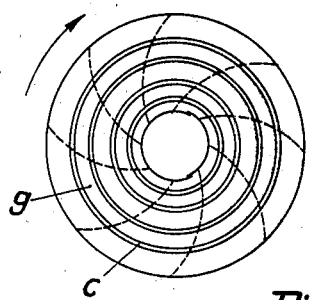
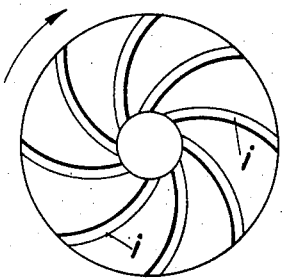
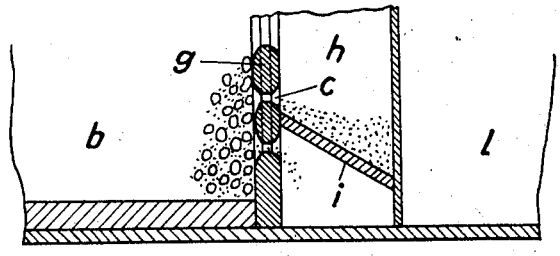
Inventors.
W. Köppen
C. Pfeiffer

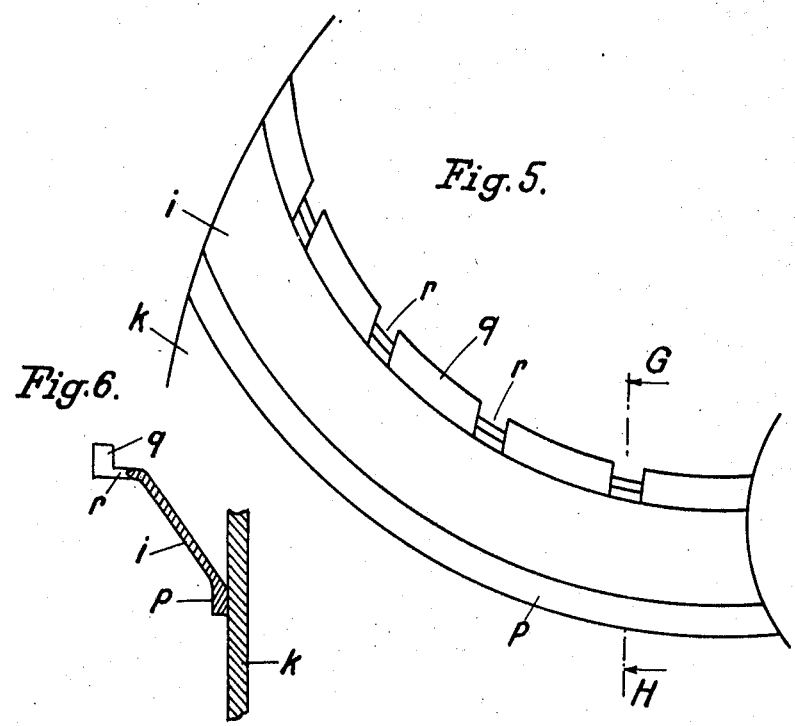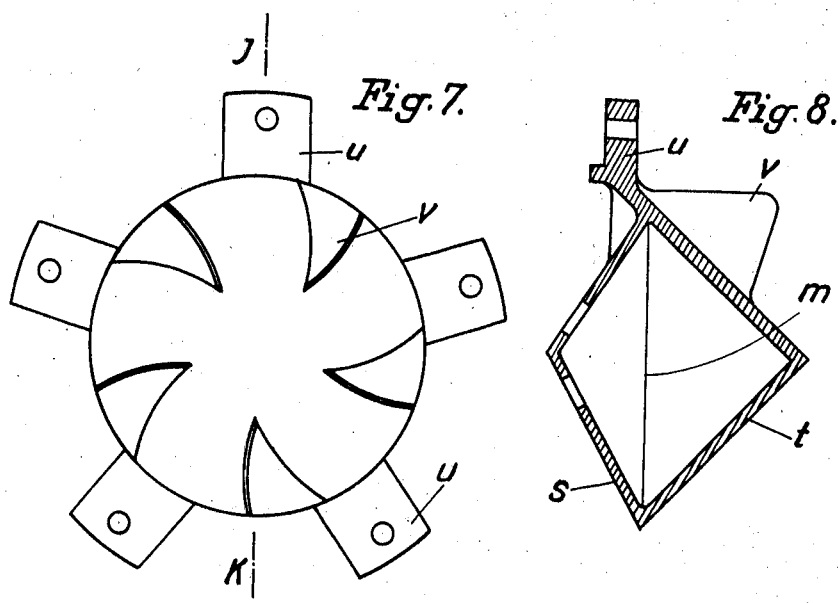

Patented July 19, 1927.

1,636,138

UNITED STATES PATENT OFFICE.

WILHELM KÖPPEN, OF BECKUM, AND CHRISTIAN PFEIFFER, OF NEUBECKUM, GERMANY.

BALL OR TUBE MILL.

Application filed December 8, 1926, Serial No. 153,420, and in Germany December 8, 1925.

The invention relates to a ball- or tube-mill for disintegrating any kind of material to be ground and has for its principal purpose, making the employment of sieves, ordinarily used, superfluous.

According to the invention, a separating-chamber, built into the drum or tube of the mill, is limited towards the preliminary grinding-chamber by concentric rings of special shape and design. This insertion, built into the mill, has been dimensioned comparatively short, so that foreshortening of the effective grinding-space does practically not take place. Care has furthermore been taken, that the material to be ground may eventually return from the said insertion into the preliminary grinding-chamber. By the arrangement of obliquely disposed scoops into the insertion, choking-up of the ring-wall gaps is effectively avoided.

One example of executing the invention is illustrated in the drawings, in which

Fig. 1 is a longitudinal section through a ball-, or tube-mill fitted with the novel insertion, Fig. 2 is a section on the line E—F of Fig. 1, Fig. 3 is a section on the line A—B, Fig. 4 a section on the line C—D of Fig. 1.

Fig. 5 is a partial view of the intermediate chamber in enlarged scale, after the rings have been removed, Fig. 6 is a section on the line G—H of Fig. 5, Fig. 7 illustrates a cone-element provided in the intermediate chamber, Fig. 8 is a section on the line I—K of Fig. 7.

In the drawings, $a$ is the charging-aperture for the material to be ground. The material is preliminarily ground in the preliminary grinding-chamber $b$, which is filled with balls. After the material has reached the ring-wall $g$, the fine enough ground material is discharged through the ring-gaps $c$, as shown in Fig. 2. The coarser pieces of material and the balls do not obstruct the gaps $c$, as the single rings are arched on their surface. The ground material discharged through the gaps $c$, is passed to the chamber $h$, in which obliquely disposed scoops $i$ have been provided. This oblique displacement of the said scoops has the purpose of deflecting the ground material immediately from the gaps and keep the same open. The chamber $h$ is separated from the fine grinding-chamber $l$ by a partition $k$ having an opening only in the center. The material to be ground is conveyed in the direction of the arrow $f$ into the fine grinding-chamber $l$, but the same may fall back into the preliminary grinding-chamber $b$, if the chamber $h$ should be filled too much.

A deflector $m$ is provided in the chamber $h$, having about the shape of a double cone, whereby discharging the ground material into the fine grinding-chamber $l$, or the preliminary grinding-chamber $b$ is effected.

This double cone is illustrated in Figs. 7 and 8 in an enlarged scale. The double cone $m$ consists of a truncated cone $s$ and a more pointed cone $t$ and is provided with lugs $u$ fastened to the inner ring $g$.

The double cone $m$ is consequently likewise supported by the scoops $i$, to which the rings $g$ are attached. It is practical to provide the more pointed cone $t$ with blades $v$.

Fig. 3 illustrates the arrangement of the rings on the ring-wall, Fig. 4 the arrangement of the scoops. The scoops $i$ serve as supports for the concentric rings $g$. The scoops $i$ have a flange $p$, fastened to the wall $k$ and a second flange $q$. The latter flange $q$ is provided with slots $r$ located at such points, where the slots are situated between the rings $g$. On account of the arrangement of the slots $r$, the ring-shaped gaps between the rings $g$ are not interrupted. As shown by Fig. 6, the scoops $i$ are running out pointed at the end of the slot $r$. The ground material is therefore in no way obstructed in its passage through the ring-slots.

The rings $g$ are thus freely suspended and their intermediate spaces form continuous ring-shaped slots in which no ground material can stick fast as in holes or limited slots. On the contrary, the ground material will be kept permanently moving in the said continuous slots.

The inlet-point of the ring-slots can not be obstructed and an uninterrupted conveyance is inside the insertion effected by the oblique scoops *i*.

Instead of the arched cross-section of the surface of the rings *g* facing the preliminary grinding-chamber, a roof-shaped section may be selected. The rings *g*, respectively the ring-gaps may run eccentric instead of concentric.

A special advantage of the insertion is its simplicity in spite of the considerably improved efficiency of the mill obtained thereby. The insertion can easily be built into any existing mill, eventually even in a multiple arrangement. As shown in Fig. 1, it takes up very little space, so that the effective grinding-surface of the tube is practically not impaired by the same.

The mode of action is as follows: The material charged by the opening *a*, is more or less disintegrated in the chamber *b* of the tube consequent to the rotation of the tube. The sufficiently disintegrated parts pass through the slots between the rings *g*, into the intermediate chamber *d*. The material drops hereby upon the oblique scoops *i* and is thereby subdivided in such a manner, that the coarser parts are retained upon the higher part close to the rings, while the fine particles slide down on the inclined surface and come into the neighbourhood of the wall *k*. During rotation of the tube the thus subdivided material passes over the double cone *m* and slides down on the same. The finer material passes over the cone in the chamber *l* of the tube, while the coarser parts of the material drop back into the chamber *b*.

We claim:—

1. In a ball- or tube-mill containing a preliminary grinding chamber, a fine grinding chamber and an intermediate chamber, concentric rings forming the wall of said intermediate chamber facing the preliminary grinding-chamber, said rings having on their entire periphery a free cross-section for the passage of the material to be ground.

2. In a ball- or tube-mill containing a preliminary grinding chamber, a fine grinding chamber and an intermediate chamber, concentric rings arched convex towards the preliminary grinding-chamber forming the wall of said intermediate chamber facing the preliminary grinding-chamber, said rings having on their entire periphery a free cross-section for the passage of the material to be ground.

3. In a ball- or tube-mill containing a preliminary grinding chamber, a fine grinding chamber and an intermediate chamber, concentric rings forming the wall of said intermediate chamber facing the preliminary grinding-chamber, said rings having on their entire periphery a free cross-section for the passage of the material to be ground, scoops being obliquely disposed in said intermediate chamber.

4. In a ball- or tube-mill containing a preliminary grinding chamber, a fine grinding chamber and an intermediate chamber, concentric rings forming the wall of said intermediate chamber facing the preliminary grinding-chamber, said rings having on their entire periphery a free cross-section for the passage of the material to be ground, scoops being obliquely disposed in said intermediate chamber, said scoops having the shape of cone-mantle sections.

5. In a ball- or tube-mill containing a preliminary grinding chamber, a fine grinding chamber and an intermediate chamber, concentric rings arched convex towards the preliminary grinding chamber forming the wall of said intermediate chamber facing the preliminary grinding-chamber, said rings having on their entire periphery a free cross-section for the passage of the material to be ground, scoops being obliquely disposed in said intermediate chamber.

6. In a ball- or tube-mill containing a preliminary grinding chamber, a fine grinding chamber and an intermediate chamber, concentric rings arched convex towards the preliminary grinding chamber forming the wall of said intermediate chamber facing the preliminary grinding chamber, said rings having on their entire periphery a free cross-section for the passage of the material to be ground, scoops being obliquely disposed in said intermediate chamber, said scoops having the shape of cone-mantle sections.

7. In a ball- or tube-mill containing a preliminary grinding chamber, a fine grinding chamber and an intermediate chamber, concentric rings forming the wall of said intermediate chamber facing the preliminary grinding chamber, said rings having on their entire periphery a free cross-section for the passage of the material to be ground, scoops being obliquely disposed in said intermediate chamber, said concentric rings being connected by said scoops to the rear wall of the intermediate chamber.

8. In a ball- or tube-mill containing a preliminary grinding chamber, a fine grinding chamber and an intermediate chamber, concentric rings forming the wall of said intermediate chamber facing the preliminary grinding chamber, said rings having on their entire periphery a free cross-section for the passage of the material to be ground, a central opening in the walls of said intermediate chamber and a double cone-shaped element arranged in the axis of said intermediate chamber, said double cone-shaped element being supported by said concentric rings.

9. In a ball- or tube-mill containing a preliminary grinding chamber, a fine grinding chamber and an intermediate chamber, concentric rings forming the wall of said intermediate chamber facing the preliminary grinding chamber, said rings having on their entire periphery a free cross-section for the passage of the material to be ground, scoops being obliquely disposed in said intermediate chamber, a central opening in the walls of said intermediate chamber and a double cone-shaped element arranged in the axis of said intermediate chamber, said double cone-shaped element being supported by said concentric rings, said concentric rings being connected by said scoops to the rear wall of the intermediate chamber.

In testimony whereof we have affixed our signatures.

WILHELM KÖPPEN.
CHRISTIAN PFEIFFER.